United States Patent
Hirabayashi et al.

(10) Patent No.: US 11,974,028 B2
(45) Date of Patent: Apr. 30, 2024

(54) INFORMATION PROCESSING DEVICE, INFORMATION PROCESSING METHOD, REPRODUCTION PROCESSING DEVICE, AND REPRODUCTION PROCESSING METHOD

(71) Applicant: Sony Group Corporation, Tokyo (JP)

(72) Inventors: Mitsuhiro Hirabayashi, Tokyo (JP); Ryohei Takahashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 187 days.

(21) Appl. No.: 17/623,254

(22) PCT Filed: Jun. 4, 2020

(86) PCT No.: PCT/JP2020/022204
§ 371 (c)(1),
(2) Date: Dec. 28, 2021

(87) PCT Pub. No.: WO2021/002142
PCT Pub. Date: Jan. 7, 2021

(65) Prior Publication Data
US 2022/0369005 A1    Nov. 17, 2022

Related U.S. Application Data

(60) Provisional application No. 62/870,719, filed on Jul. 4, 2019.

(51) Int. Cl.
*H04N 21/854* (2011.01)
*H04N 21/84* (2011.01)

(52) U.S. Cl.
CPC ....... *H04N 21/85406* (2013.01); *H04N 21/84* (2013.01)

(58) Field of Classification Search
CPC .................. H04N 21/85406; H04N 21/84
See application file for complete search history.

(56) References Cited

U.S. PATENT DOCUMENTS

| 2016/0150241 A1* | 5/2016 | Hirabayashi ..... H04N 21/85406 375/240.21 |
| 2019/0007676 A1* | 1/2019 | Katsumata ........... H04N 13/178 |

FOREIGN PATENT DOCUMENTS

| CN | 105379255 A | 3/2016 |
| CN | 105379256 A | 3/2016 |

(Continued)

OTHER PUBLICATIONS

"Information Technology—Coding of Audio-Visual Objects—Part 12: ISO Base Media File Format", ISO/IEC 14496-12:2015, IEC, 3, Rue De Varembe, PO Box 131, CH-1211 Geneva 20, Switzerland, Nov. 25, 2015 (Nov. 25, 2015), pp. 1-233, XP082009954, [retrieved on Nov. 25, 2015].

(Continued)

*Primary Examiner* — Mishawn N. Hunter
(74) *Attorney, Agent, or Firm* — XSENSUS LLP

(57) ABSTRACT

Provided are an information processing device, an information processing method, a reproduction processing device, and a reproduction processing method that reduce the amount of information and provide a viewer with a high-quality viewing experience. A preprocessing unit individually generates SubSample information used for decoding each of SubSamples, which are a plurality of component streams, in a content stream including the SubSamples. The file generation unit generates a file including the SubSample1 information generated by the preprocessing unit.

14 Claims, 17 Drawing Sheets

(56) References Cited

FOREIGN PATENT DOCUMENTS

| CN | 108476346 A | 8/2018 |
|---|---|---|
| CN | 108702478 A | 10/2018 |
| JP | 2006129078 A | 5/2006 |
| JP | 2019-511173 A | 4/2019 |
| WO | 2015/012225 A1 | 1/2015 |
| WO | 2017/145756 A1 | 8/2017 |

OTHER PUBLICATIONS

Lhomme M Bunkus D Rice S: "Matroska Specifications; draft-ietf-cellar-matroska-02.", Matroska Specifications; Draft-IETF-Cellar-Matroska-02; Internet-Draft: Cellar, Internet Engineering Task Force, IETF; StandardWorkingDraft, Internet Society (ISOC) 4, Rue Des Falaises CH-1205 GE, No. 2 Jan. 9, 2019 (Jan. 9, 2019), pp. 1-167, XP015130561.
Ryohei Takahashi et al: "On V-PCC Single Track Encapsulation", 125. MPEG Meeting; Jan. 14, 2019-Jan. 18, 2019; Marrakech, Morocco; (Motion Picture Expert Group or 1S0/IEC JTC1/SC29/WG11), No. m46006 Jan. 9, 2019 (Jan. 9, 2019), XP030214452.
International Search Report and Written Opinion dated Sep. 8, 2020, received for PCT Application PCT/JP2020/022204, Filed on Jun. 4, 2020, 9 pages including English Translation.
"Information technology—Coding of Audiovisual Objects—Part 12:ISO Base Media File Format", International Standard, ISO/IEC14496-12, Fifth Edition, Dec. 15, 2015, 248 pages.

* cited by examiner

FIG.3

```
Alingned(8) Class SubSampleEntryBox extends FullBox("sssd", version=0, flag=0")
{
    unsigned int(16) component_id;
    unsigned int(16) muxed_stream_specific_type;
    unsigned int(32) handler_type;
    unsigned int(16) entry_count;
    For (i=0; i<entry_count; i++){
        SubSampleEntry();
    }
}
```

FIG.4

```
Alingned(8) Class SubSampleToChunkBox extends FullBox("sssc", version=0, flag=0")
{
 unsigned int(16) component_id;
 unsigned int(16) entry_count;
 For (i=0; i<entry_count; i++){
  unsigned int(32) first_sub_sample_number;
  unsigned int(32) sub_sample_entry_index;
 }
}
```

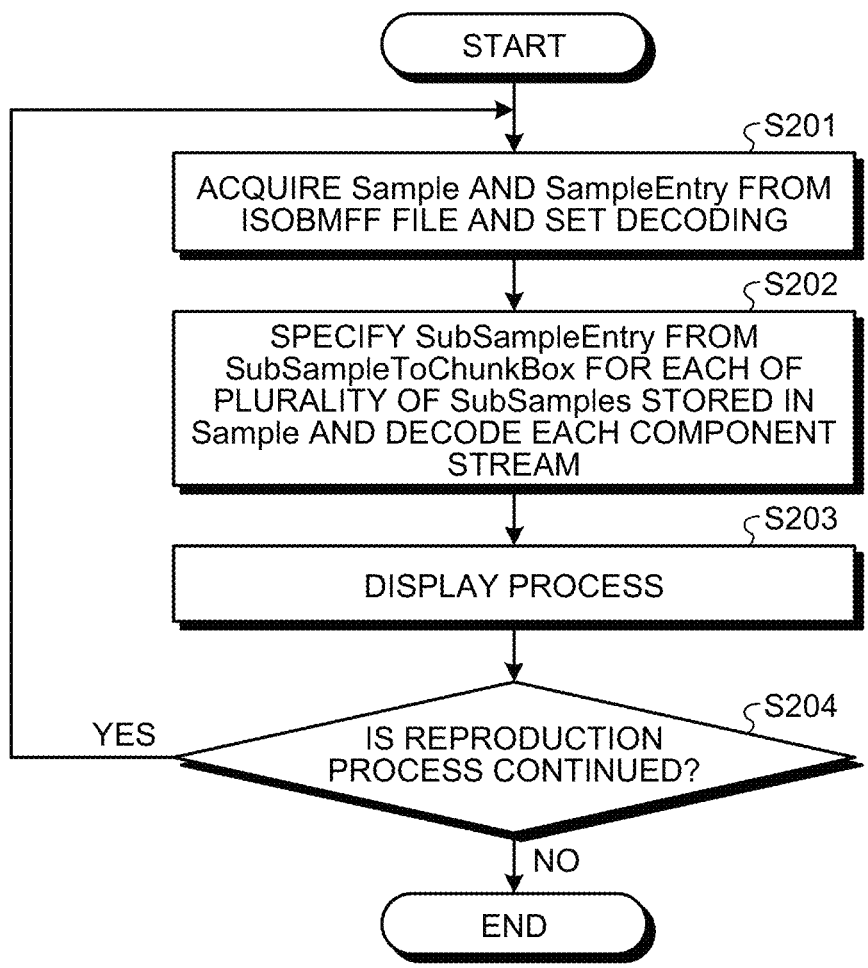

```
Alingned(8) Class SubSampleToHandlerBox extends FullBox("sshl, version=0, flag=0")
{
    unsigned int(16) entry_count;
    For (i=0; i<entry_count; i++){
        unsigned int(16) component_id;
        unsigned int(32) handler_type;
    }
}
```

182

```
Alingned(8) Class SubSampleEntryBox extends FullBox("sssd, version=0, flag=0")
{
    unsigned int(16) component_id;
    unsigned int(16) muxed_stream_specific_type;
    unsigned int(16) entry_count;
    For (i=0; i<entry_count; i++){
        SubSampleEntry();
    }
}
```

INFORMATION PROCESSING DEVICE, INFORMATION PROCESSING METHOD, REPRODUCTION PROCESSING DEVICE, AND REPRODUCTION PROCESSING METHOD

CROSS-REFERENCE TO RELATED APPLICATIONS

The present application is based on PCT filing PCT/JP2020/022204, filed Jun. 4, 2020, which claims priority to U.S. Provisional Application No. 62/870,719, filed Jul. 4, 2019, the entire contents of each are incorporated herein by reference.

FIELD

The present invention relates to an information processing device, an information processing method, a reproduction processing device, and a reproduction processing method.

BACKGROUND

In recent years, Moving Picture Experts Group-Dynamic Adaptive Streaming over Hypertext Transfer Protocol (MPEG-DASH) and the like have begun to spread as a basic technology of streaming services on the Internet. In addition, in streaming with MPEG-DASH, for example, a technology of storing video data and audio data in an International Organization for Standardization Base Media File Format (ISOBMFF) file for distribution is used. Here, ISOBMFF is a standard of a MPEG-4 file format.

In addition, MPEG-I Part 5 Video-based Point Cloud Compression (ISO/IEC 23090-5) specifies a compression method of Point Cloud that is a set of points simultaneously having position information and attribute information (particularly color information) in a three-dimensional space. One of the compression methods is a method called Video-based Point Cloud Coding (V-PCC) as described below. In V-PCC, the Point Cloud is segmented into regions and each region is projected on a plane to generate an attribute image including color information and the like, a geometry image including depth information, an occupancy image, and information metadata for reconstructing the Point Cloud using a patch. The metadata includes a patch sequence and a sequence parameter set. These three images are then encoded by a video codec, and four component streams in total are generated. In addition, in the case of a video content having a plurality of pieces of audio information and subtitle information, a plurality of component streams are also stored in individual tracks in V-PCC. Hereinafter, the video content decoded by using the V-PCC technology is referred to as "V-PCC content".

However, since a plurality of component streams in the V-PCC content include common elements such as time information and codec information, in a case where the component streams are stored in individual tracks, file management information is stored redundantly. Consequently, in the method of storing the respective component streams in different tracks, it is conceivable that management information such as moov and voof of ISOBMFF is redundant.

In order to distinguish common information and information specific to the component stream for management and reduce the amount of information, a method using a Muxed (multiplexed) track in which a plurality of component streams are stored in one track has been proposed.

CITATION LIST

Non Patent Literature

Non Patent Literature 1: ISO/IEC 14496-12: 2015 Information technology. Coding of audio-visual object. Part 12: ISO base media file format, 2015-12

SUMMARY

Technical Problem

However, in the proposed method using a muxed track, although the amount of information can be reduced, it is difficult to associate codec information that is switched according to each component stream. Consequently, in the proposed method using a muxed track, it is difficult to dynamically change the encoding parameters of the component stream.

Therefore, the present disclosure provides an information processing device, an information processing method, a reproduction processing device, and a reproduction processing method that reduce the amount of information and provide a viewer with a high-quality viewing experience.

Solution to Problem

According to the present disclosure, a preprocessing unit individually generates SubSample information used for decoding each of SubSamples, which are a plurality of component streams, in a content stream including the SubSamples. The file generation unit generates a file including the SubSample1 information generated by the preprocessing unit.

BRIEF DESCRIPTION OF DRAWINGS

FIG. 3 is a diagram illustrating an example of syntax of SubSampleEntryBox.

FIG. 4 is a diagram illustrating an example of syntax of SubSampleToChunkBox.

FIG. 10 is a flowchart of a reproduction process performed by the client device according to the first embodiment.

FIG. 11 is a diagram illustrating an example of syntax of SubSampleToHandlerBox and SubSampleEntryBox according to a modification of the first embodiment.

DESCRIPTION OF EMBODIMENTS

Figure 1:
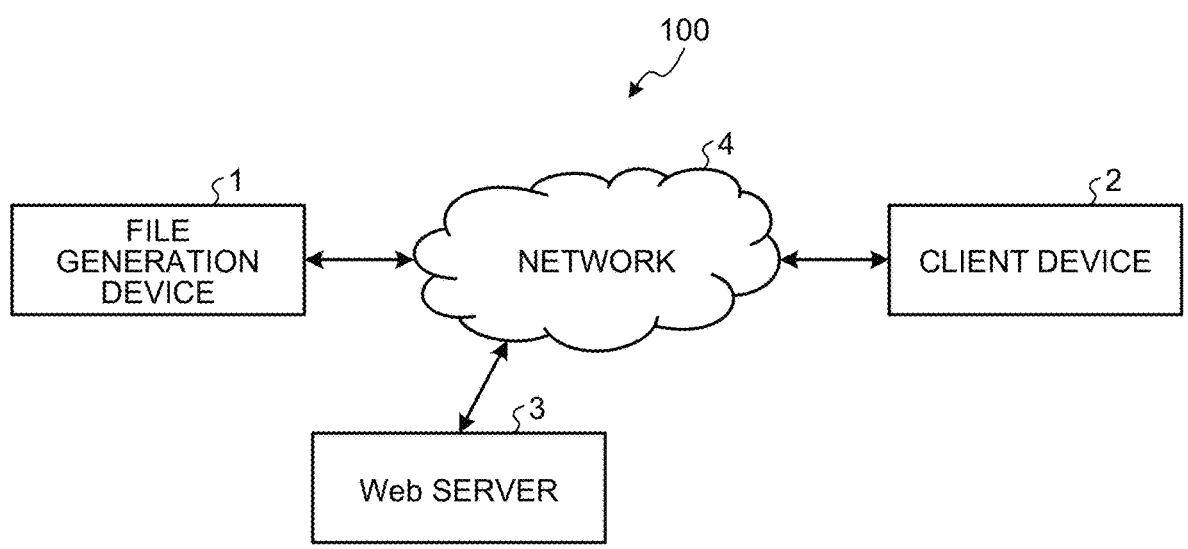
FIG. 1 is a system configuration diagram of an example of a distribution system.

Hereinafter, embodiments of the present disclosure will be described in detail with reference to the drawings. Note that in each of the following embodiments, the same reference numerals are given to the same components, and duplicate description will be omitted. In addition, the scope disclosed in the present technology is not limited to the contents of the embodiments, and includes the contents described in the following Non Patent Literatures known at the time of filing.

Non Patent Literature 1: (described above)
Non Patent Literature 2: N18413, WD of ISO/IEC 23090-10 Carriage of PC data, 126th MPEG meeting, Geneva, Switzerland, March 2019
Non Patent Literature 3: N18180, Technologies under consideration on carriage of PC data, 126th MPEG meeting, Geneva, Switzerland, March 2019
Non Patent Literature 4: m47257, PCC file format Consideration, 126th MPEG meeting, Geneva, Switzerland, March 2019

The contents described in the Non patent literatures mentioned above are also incorporated into this embodiment by reference. That is, the contents described in the Non patent literatures mentioned above also serve as a basis for determining a support requirement. For example, even in a case where terms used in File Structure described in Non Patent Literature 1 and V-PCC File Structure described in Non Patent Literature 2 are not directly defined in the detailed description of the invention, they fall within the scope of the present disclosure and satisfy the support requirements of the claims. In addition, for example, technical terms such as parsing, syntax, and semantics are also within the scope of the present disclosure and satisfy the support requirements of the claims even if they are not directly defined in the detailed description of the invention.

Furthermore, the present disclosure will be described according to the following order of items.
1. First Embodiment
    1.1 Modification of First Embodiment
2. Second Embodiment
    2.1 Modification of Second Embodiment
3. Third Embodiment 1. First Embodiment (Configuration of Distribution System According to First Embodiment)

FIG. 1 is a system configuration diagram of an example of a distribution system. A distribution system 100 includes a file generation device 1 that is an information processing device, a client device 2 that is a reproduction processing device, and a Web server 3. The file generation device 1, the client device 2, and the Web server 3 are connected to a network 4. Then, the file generation device 1, the client device 2, and the Web server 3 can communicate with each other via the network 4. Here, although one file generation device 1 and one client device 2 are illustrated in FIG. 1, the distribution system 100 may include a plurality of file generation devices 1 and a plurality of client devices 2.

The file generation device 1 generates a video content that is data for providing a video. The content stream of the video content generated by the file generation device 1 according to the present embodiment includes a plurality of component streams. The video content generated by the file generation device 1 according to the present embodiment includes, for example, a V-PCC content. The file generation device 1 uploads the generated video content to the Web server 3. Here, the present embodiment describes a configuration in which the Web server 3 provides the video content to the client device 2, but the distribution system 100 can adopt another configuration. For example, it may be configured so that the file generation device 1 includes the function of the Web server 3, stores the generated video content in the file generation device 1 itself, and provides the generated video content to the client device 2.

The Web server 3 holds the video content uploaded from the file generation device 1. The Web server 3 then provides a designated video content according to a request from the client device 2.

The client device 2 transmits a video content transmission request to the Web server 3. The client device 2 then acquires a video content designated by the transmission request from the Web server 3. The client device 2 then decodes the video content to generate a display video, and displays the display video on a display device such as a monitor.

(Configuration of File Generation Device According to First Embodiment)

Figure 2:
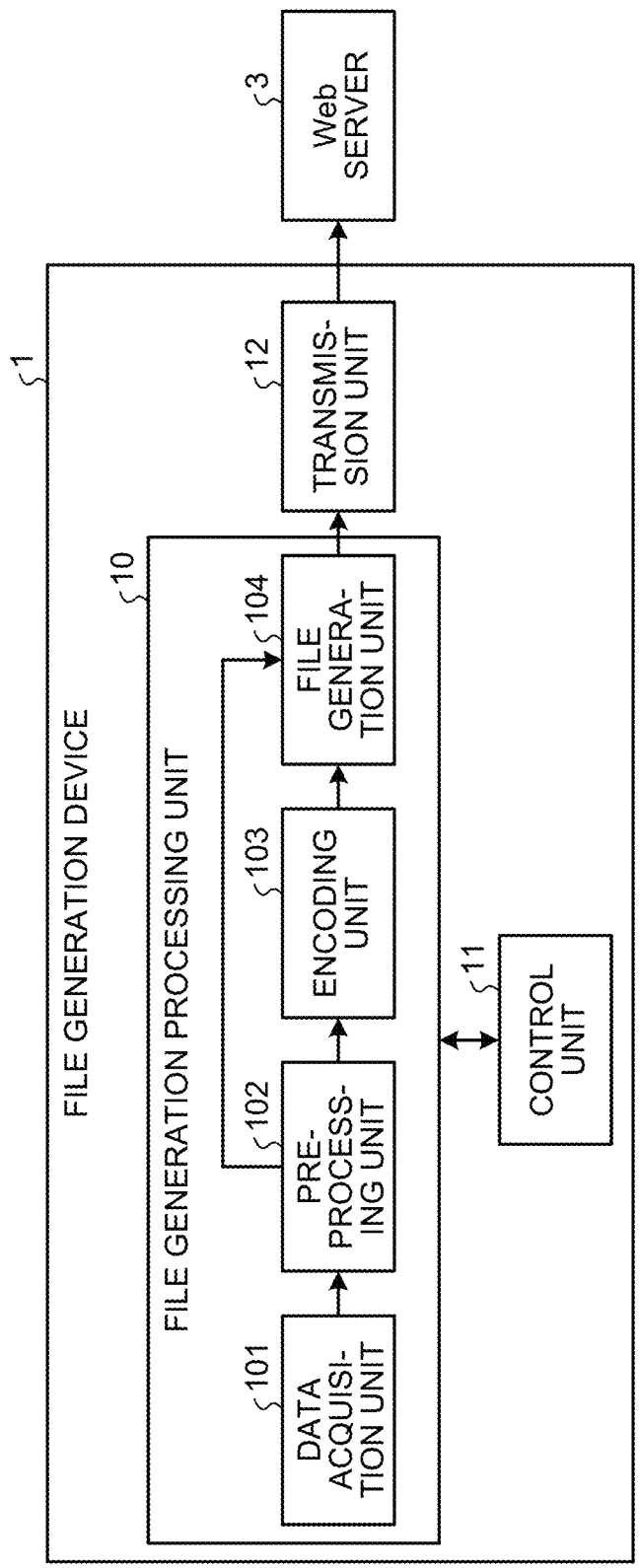
FIG. 2 is a block diagram of a file generation device.

Next, details of the file generation device 1 will be described. FIG. 2 is a block diagram of the file generation device. As illustrated in FIG. 2, the file generation device 1 that is an information processing device includes a file generation processing unit 10, a control unit 11, and a transmission unit 12. The control unit 11 performs processing related to control of the file generation processing unit 10. For example, the control unit 11 controls an operation timing of each unit of the file generation processing unit 10 or the like in a centralized manner. The file generation processing unit 10 includes a data acquisition unit 101, a preprocessing unit 102, an encoding unit 103, and a file generation unit 104.

The data acquisition unit 101 acquires original data of a video content for displaying a video. The original data of the video content includes image data of each image included in an image sequence that is a series of images, and control information. The control information includes, for example, information about time information of each piece of image data. The data acquisition unit 101 outputs the image data included in the image sequence of the acquired video content and the control information to the preprocessing unit 102.

The preprocessing unit 102 receives an input of the image data included in the image sequence and the control information from the data acquisition unit 101. The preprocessing unit 102 then determines a bit stream configuration of the image sequence on the basis of the acquired data. In this case, the preprocessing unit 102 determines to store data of a plurality of component streams in one track.

Specifically, each of the plurality of component streams is referred to as "SubSample", and data of a bit stream that is one Sample including a plurality of SubSamples is stored in one track. Hereinafter, a track storing data of a plurality of component streams is referred to as a "Muxed track". For example, in a case where V-PCC is used for decoding, the preprocessing unit 102 determines to store data of one Sample in a Muxed track, in which a component stream of each of an attribute image, a geometry image, an occupancy image, and metadata is SubSample. Here, a case where fragmentation that divides one content into a plurality of pieces is performed will be described.

Next, the preprocessing unit 102 generates SampleEntry including management information such as encoding parameters of Sample in the Muxed track. The encoding parameters of Sample in the Muxed track include, for example, information indicating that Sample is a Muxed track, information indicating that codec of Sample is V-PCC, and the like.

Further, the preprocessing unit 102 generates SubSample-related information by using the control information. Here, the SubSample-related information is information related to SubSample corresponding to each component included in the Muxed track. For example, the SubSample-related information includes SubSampleEntryBox.

FIG. 3 is a diagram illustrating an example of syntax of SubSampleEntryBox. Component_id is an identifier for uniquely identifying each component stream stored in the Muxed Track. Here, in the present embodiment, component_id is determined so as to correspond to the logical position order of SubSamples in Sample. As a result, since component_id and the logical position of SubSample are linked, SubSampleEntry corresponding to component_id can be specified. However, the present invention is not limited thereto, and the preprocessing unit 102 may link component_id with SubSampleEntry by setting the same identifier in codec specific parameter of SubSampleInfomationBox and muxted_stream_specific_type of SubSumpleEntryBox, which are access information to SubSample. This component_id corresponds to tack_id of moov in Sample.

Handler_type in the syntax of FIG. 3 represents handler information that is media attribute information of each component stream. The handler information corresponds to an example of "second related information". For example, in the case of a video, handler_type is set to vide, and in the case of audio, handler_type is set to soun. The class of SubSampleEntry is determined by this handler_type.

Muxed_stream_specific_type in the syntax of FIG. 3 is type information for identifying the type of each component stream in the Muxed tarck. For example, in V-PCC Sample, since the attribute image, the geometry image, and the occupancy image are the same video media, the same attribute "vide" is set as hanlder_type. Consequently, each component stream can be identified by setting, as muxed_stream_specific_type, attr in the attribute image, geom in the geometry image, occu in the occupancy image, and the like. Component_id and muxed_stream_specific_type correspond to an example of "first related information".

SubSampleEntry ( ) in the syntax of FIG. 3 has a structure similar to that of SampleEntry( ) of Track. In a case where handler_type is vide, VisualSampleEntry is set as SubSampleEntry, and in a case where handler_type is soun, AudiolSampleEntry is set as SubSampleEntry. That is, in SubSampleEntry, the class of SubSampleEntry is defined for each handler_type. SubSampleEntryBox is defined for each component stream. For example, in a case where V-PCC is used for decoding, SubSampleEntryBox is stored for each of the component streams of the attribute image, the geometry image, the occupancy image, and the metadata. Note that SubSampleEntryBox may be defined to have a for loop structure so that information for each component stream can be set in one box structure.

Further, the preprocessing unit 102 in FIG. 2 generates SubSample correspondence information. The SubSample correspondence information is information for linking each SubSample included in Sample of the Muxed track and each piece of SubSample-related information.

For example, the preprocessing unit 102 sets, as the SubSample correspondence information, component_id that is identification information of a component stream of SubSample and an arbitrary number for identifying SubSampleEntry allocated to SubSample. For this purpose, SubSampleToChunkBox corresponding to each SubSample is set as the SubSample correspondence information.

FIG. 4 is a diagram illustrating an example of syntax of SubSampleToChunkBox. First_sub_sample_number in the syntax of FIG. 4 represents the number of Sample to which SubSampleEntry designated by the following sub_sample_entry_inedx is applied, more specifically, the number of the first SubSample among a plurality of SubSamples that constitute Sample and are arranged in time series. In addition, sub_sample_entry_inedx represents identification information of SubSampleEntry applied from the number of the first SubSample indicated by SubSampleEntry to the number of SubSample, the number being before the number indicated by first_sub_sample_number in the next SubSampleToChunkBox. This information corresponds to an example of information for linking SubSample and SubSampleEntry.

In this manner, the preprocessing unit 102 can set SubSampleEntry corresponding to each SubSample by generating SubSample correspondence information. This makes it possible to dynamically set SubSampleEntry for each SubSample.

Here, it is set that SubSampleToChunkBox can be generated for each component stream, but the preprocessing unit 102 may define SubSampleToChunkBox to have a for loop structure so that each component stream can be set in one box structure.

Further, the preprocessing unit 102 generates metadata of each image and metadata indicating access information to a bit stream. In addition, the preprocessing unit 102 also generates control information such as information as to what codec is used for compression as metadata.

The preprocessing unit 102 then outputs each piece of image data included in an image sequence and metadata such as codec information to the encoding unit 103. In addition, the preprocessing unit 102 outputs, to the file generation unit 104, metadata including SubSample-related information, SubSample correspondence information, information of each image, the access information to a bit stream, and the like.

The encoding unit 103 receives an input of image data of each image included in the image sequence. The encoding unit 103 then encodes the image data of each image in the image sequence to generate an encoded stream. In the present embodiment, the encoding unit 103 generates a plurality of component streams as encoded streams. For example, in a case where decoding is performed by V-PCC, the encoding unit 103 generates four component streams of the tribute image, the geometry image, the occupancy image, and the metadata as encoded streams. Each component stream includes a bit stream of each corresponding image or metadata. The data of the bit stream is stored in a track for each frame or each associated frame. The encoding unit 103 according to the present embodiment stores data of a plurality of bit streams in one track to generate a Muxed track. The encoding unit 103 outputs the generated encoded stream to the file generation unit 104.

The file generation unit 104 receives an input of the encoded stream including a plurality of component streams from the encoding unit 103. In addition, a file generation unit 105 receives an input of the metadata including the SubSample-related information and the SubSample correspondence information from the preprocessing unit 102.

The file generation unit 104 stores the encoding parameters of SubSample included in the Muxed track in SampleEntryBox. In addition, the file generation unit 104 newly defines SubSampleEntryBox in which SubSample-related information is stored, and stores SubSampleEntryBox in SampleTableBox in Moov of an ISOBMFF file.

Furthermore, the file generation unit 104 newly defines SubSampleToChunkBox in which SubSample correspondence information is stored, and stores SubSampleToChunkBox in moof that is a file header region of ISOBMFF in a case where fragmentation is performed. As a result, the file generation unit 104 associates SubSample stored in each mdat in a fragmented state with each SubSampleEntry stored in moov.

Here, the present embodiment has described a case where fragmentation is performed, but the configuration of the present embodiment can also be applied to a case where fragmentation is not performed. In this case, the file generation unit 104 disposes SubSmapleToChunkBox in SampleTableBox.

The file generation unit 105 stores the SubSampleEntryBox and SubSampleToChunkBox in the ISOBMFF file for each segment together with the image data and metadata of each component stream, thereby creating a file. Specifically, the file generation unit 105 generates an ISOBMFF file including (moov) that is management information, (mdat) that is fragmented video information, and management information (moof) of each piece of video information. mdat is a data region in the ISOBMFF file. In addition, moov and moof are header regions in ISOBMFF. As described above, the file generation unit 105 then stores SubSampleEntryBox in Sampletable of moov, and also stores SubSampleToChunkBox in TrackFragment of each moof. In this way, the file generation unit 105 generates the segment file of the video content.

Figure 5:
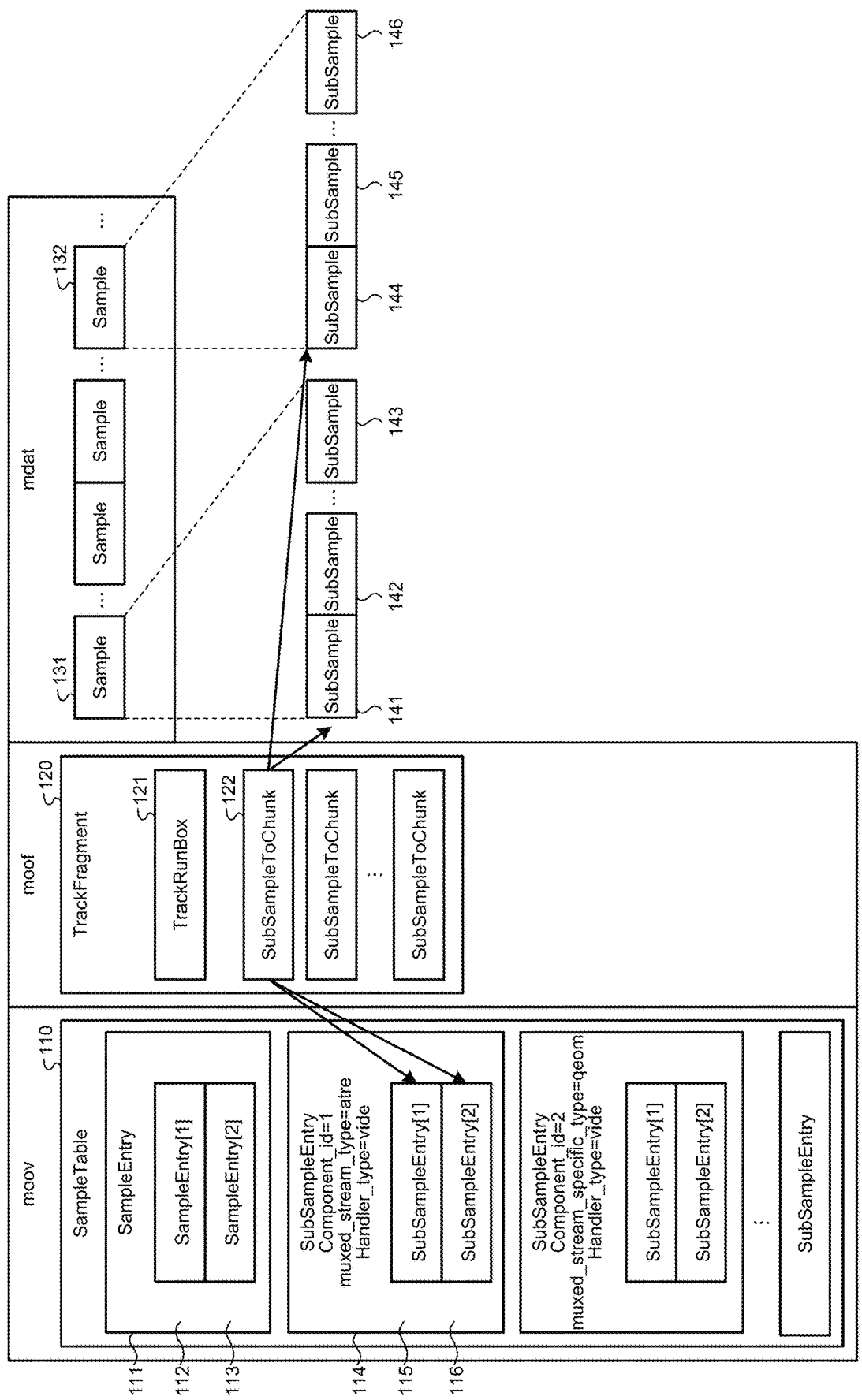
FIG. 5 is a diagram illustrating each piece of information stored in an ISOBMFF file according to a first embodiment.

Here, each piece of information stored by the file generation unit 105 will be collectively described with reference to FIG. 5. FIG. 5 is a diagram illustrating each piece of information stored in an ISOBMFF file according to the first embodiment. FIG. 5 illustrates one set of moof and mdat, but in practice, a plurality of sets of moof and mdat with a similar structure are present.

A plurality of samples including samples 131 and 132 are stored in mdat. The respective samples including the samples 131 and 132 are a Muxed track. Then, the sample 131 includes a plurality of SubSamples including SubSamples 141 to 143 for different component streams. Similarly, the sample 132 also includes a plurality of SubSamples including SubSamples 144 to 146 for different component streams.

SampletableBox 110 is disposed in moov. SampleEntryBox 111 is then disposed in the SampleTableBox 110. SampleEntries 112 and 113 are then stored in the SampleEntryBox 111. FIG. 5 illustrates the SampleEntries 112 and 113, but in practice, there are SampleEntries whose number corresponds to the number of Samples including the samples 131 to 132. SampleEntries including the SampleEntries 112 and 113 store V-PCC information of the respective Samples including the Samples 131 to 132, information indicating Muxed Track, and the like.

In addition, the SampleTableBox 110 stores a plurality of SubSampleEntryBoxes including SubSampleEntryBox 114. The plurality of SubSampleEntryBoxes including the SubSampleEntryBox 114 are provided for each type of a component stream included in the Muxed track. The SubSampleEntryBox 114 then stores a plurality of SubSampleEntries including SubSampleEntries 115 and 116. FIG. 5 illustrates the SubSampleEntries 115 and 116, but in practice, there are SubSampleEntries as many as the number of patterns of variables corresponding to all Samples including the Samples 131 to 132. A class is defined for each handler_type in each of the SubSampleEntries including the SubSampleEntries 115 and 116.

TrackFragment 120 is disposed in moof. TrackRunBox 121 is then disposed in the TrackFragment 120. The TrackRunBox 121 has information for associating the respective Samples including the Samples 131 to 132 with the SampleEntries 112 to 113.

In addition, a plurality of SubSampleToChunkBoxes including SubSampleToChunkBox 122 are disposed in the TrackFragment 120. The plurality of SubSampleToChunkBoxes including the SubSampleToChunkBox 122 have information for associating the respective SubSamples including SubSamples 141 to 146 with the SubSampleEntries 115 and 116.

For example, it is assumed that sub_sample_number, which is the number of the SubSample 141, is 1 and sub_sample_number, which is the number of the SubSample 144, is 16. Further, it is assumed that in the SubSampleToChunk 122, sub_sample_entry_index in a case where first_sub_sample_numbe is 1 is 1, and sub_sample_entry_index in a case where first_sub_sample_numbe is 16 is 2. Furthermore, it is assumed that sub_sample_entry_index of the SubSumpleEntry 115 is 1, and sub_sample_entry_index of the SubSumpleEntry 116 is 2.

A case where the client device 2 continuously decodes the Samples 131 and 132 under this condition will be described. The client device 2 decodes SubSamples including the SubSamples 141 to 143 included in the Sample 131. At this time, for example, when decoding the SubSample 141, the client device 2 specifies the SubSampleToChunkBox 122 having the information of the SubSample 141 on the basis of first_sub_sample_number. The client device 2 then specifies the SubSampleEntryBox 114 to be used from Component_id stored in the SubSampleToChunkBox 122, and further specifies the SubSunpleEntry 115 that manages the information of the SubSample 141 in the SubSampleEntryBox 114 using sub_sample_entry_index. The client device 2 then decodes the SubSample 141 using information such as handler_type stored in the SubSunpleEntry 115.

Next, the client device 2 moves on to decoding of the Sample 132, and similarly specifies the SubSumpleEntry 116 that manages information of the SubSample 146. The client device 2 then decodes the SubSample 144 using the information of the SubSunpleEntry 116. In this way, the client device 2 can decode the Muxed track using SubSampleEntryBox and SubSampleToChunkBox.

Figure 6:
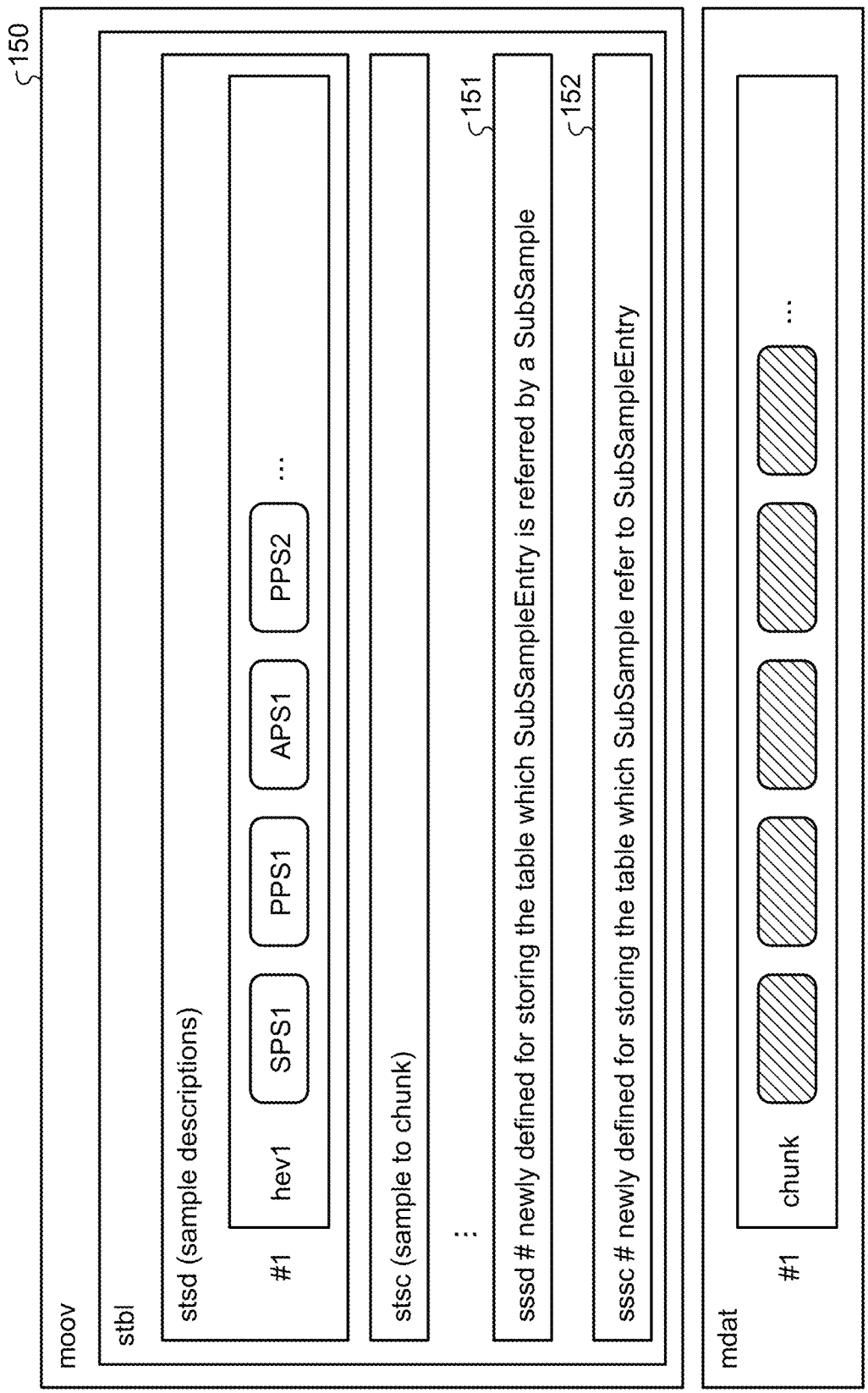
FIG. 6 is a diagram illustrating a storage state of SubSampleEntryBox.

FIG. 6 is a diagram illustrating a storage state of SubSampleEntryBox. FIG. 6 illustrates the storage state of SubSmapleEntryBox in another method. As illustrated in FIG. 6, the file generation unit 105 disposes SubSmapleEntryBox in BOX 151 in moov indicated by BOX 150, and disposes SubSampleToChunkBox in BOX 152.

Figure 7:
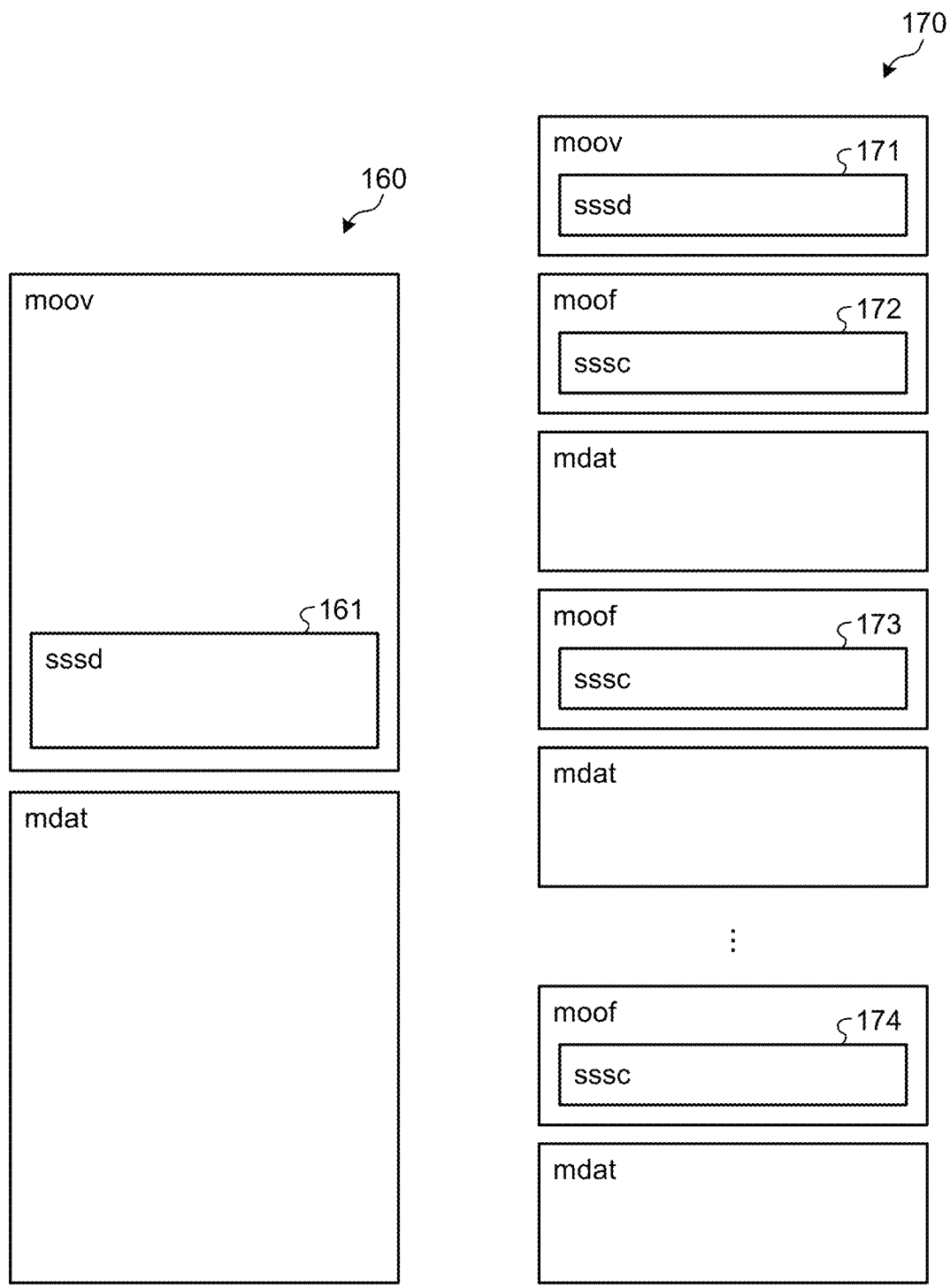
FIG. 7 is a diagram illustrating a storage state of SubSampleEntryBox and SubSampleToChunkBox depending on the presence or absence of fragmentation.

In addition, FIG. 7 is a diagram illustrating a storage state of SubSampleEntryBox and SubSampleToChunkBox depending on the presence or absence of fragmentation. In a case where movie fragmentation is not performed, as illustrated in a file 160 of FIG. 7, one moov and one mdat are present for one video content. In this case, the file generation unit 105 stores SubSampleEntryBox and SubSampleToChunkBox in moov as indicated by BOX 161.

On the other hand, in a case where movie fragmentation is performed, as illustrated in a file 170 of FIG. 7, one moov and a plurality of sets of one moof and one mdat are present for one video content. In this case, the file generation unit 105 disposes SubSampleEntryBox indicated by BOX 171 in moov. Further, the file generation unit 105 disposes SubSampleToChunkBoxes indicated by BOXes 172 to 174 in the respective moof.

Returning to FIG. 2, the description will be continued. Thereafter, the file generation unit 105 outputs the segment file of the video content including samples of the Muxed track to the transmission unit 12.

The transmission unit 12 receives an input of the segment file of the video data from the file generation unit 105. The transmission unit 12 then uploads the acquired segment file of the video data to the Web server 3.

(Configuration of Client Device According to First Embodiment)

Figure 8:
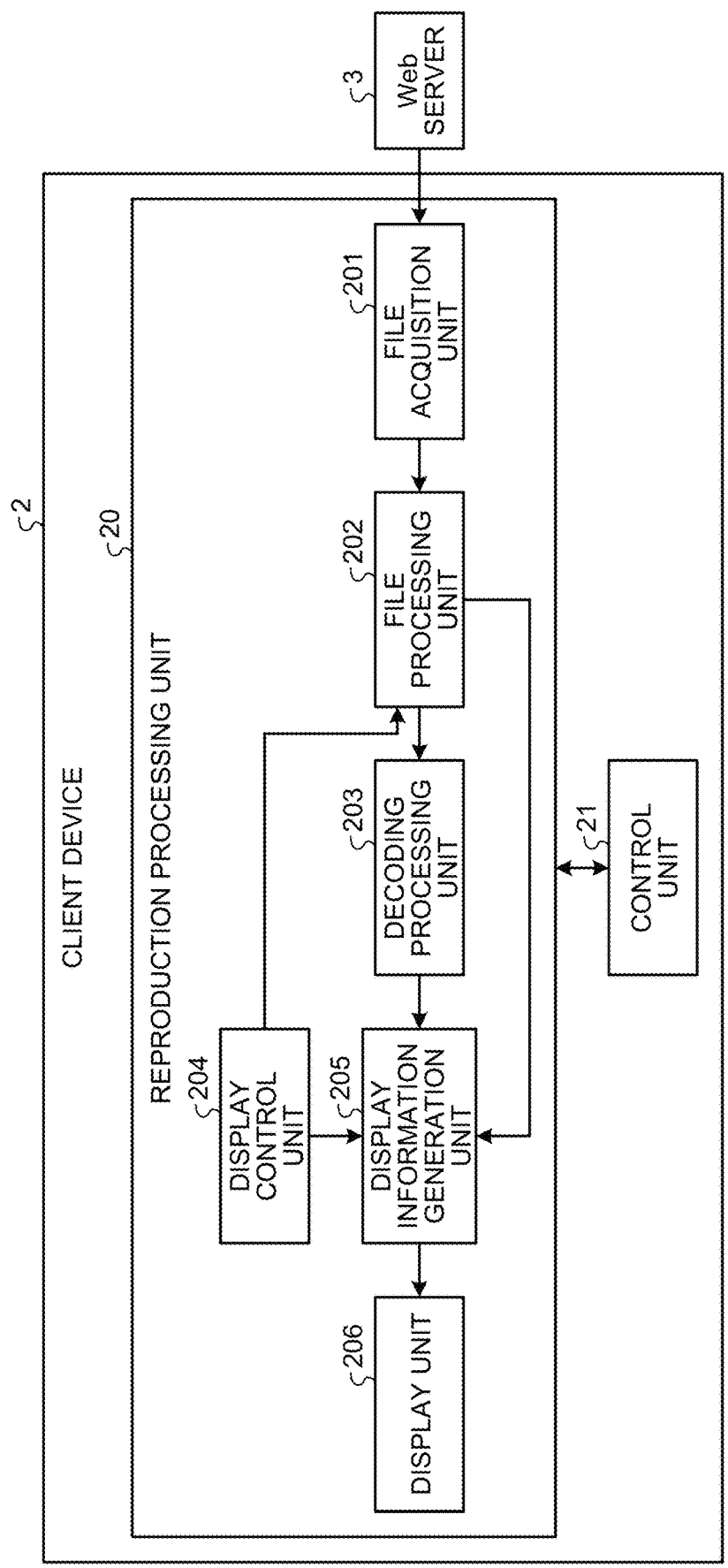
FIG. 8 is a block diagram of a client device.

FIG. 8 is a block diagram of a client device. As illustrated in FIG. 8, the client device 2 includes a reproduction processing unit 20 and a control unit 21. The control unit 21 controls an operation of each unit of the reproduction processing unit 20. For example, the control unit 21 controls an operation timing of each unit of the reproduction processing unit 20 in a centralized manner. The reproduction processing unit 20 includes a file acquisition unit 201, a file processing unit 202, a decoding processing unit 203, a display control unit 204, a display information generation unit 205, and a display unit 206.

The file acquisition unit 201 receives an input of a video content acquisition request from the file processing unit 202. The file acquisition unit 201 then acquires a segment file of a designated video content from the Web server 3. Thereafter, the file acquisition unit 201 outputs the acquired segment file to the file processing unit 202.

The file processing unit 202 receives an input of an operation command to designate a video content to be reproduced or for random access, from the display control unit 204. The file processing unit 202 then selects the video content in response to the operation command, and outputs a request to acquire the selected video content to the file acquisition unit 201.

Thereafter, the file processing unit 202 receives an input of the segment file of the video content for which the transmission request has been made, from the file acquisition unit 201. The file processing unit 202 then extracts the data of an encoded stream from the acquired segment file and outputs the data to the decoding processing unit 203. In addition, the file processing unit 202 acquires metadata from the acquired segment file and outputs the metadata to the display information generation unit 205.

The decoding processing unit 203 receives an input of data of the encoded stream from the file processing unit 202. The decoding processing unit 203 then specifies SubSampleEntry corresponding to SubSample of each component stream by using the information stored in SubSampleEntryBox and SubSampleToChunkBox, and decodes SubSample of each component stream by using the specified SubSampleEntry. As a result, the decoding processing unit 203 decodes each component stream included in the encoded stream. Thereafter, the decoding processing unit 203 outputs the data of each component stream decoded to the display information generation unit 205.

The display control unit 204 receives an operation command from an operator through an input device (not illustrated). Then, in the case of an operation command to switch the video content, the display control unit 204 outputs the operation command to the file processing unit 202. In addition, in the case of an operation command to move a viewpoint, the display control unit 204 outputs the acquired operation command to the display information generation unit 205.

The display information generation unit 205 receives an input of data of the decoded bit stream for each component stream from the decoding processing unit 203. In addition, the display information generation unit 205 receives an input of the metadata from the file processing unit 202. Further, the display information generation unit 205 receives an input of the operation command from the display control unit 204.

The display information generation unit 205 then performs rendering in response to the operation command using the acquired bit stream and metadata, and generates a display image. Thereafter, the display information generation unit 205 supplies the generated display image to the display unit 206.

The display unit 206 includes a display device such as a monitor. The display unit 206 receives an input of the display image generated by the display information generation unit 205. The display unit 206 then causes the display device to display the acquired display image.

(File Generation Procedure According to First Embodiment)

Figure 9:
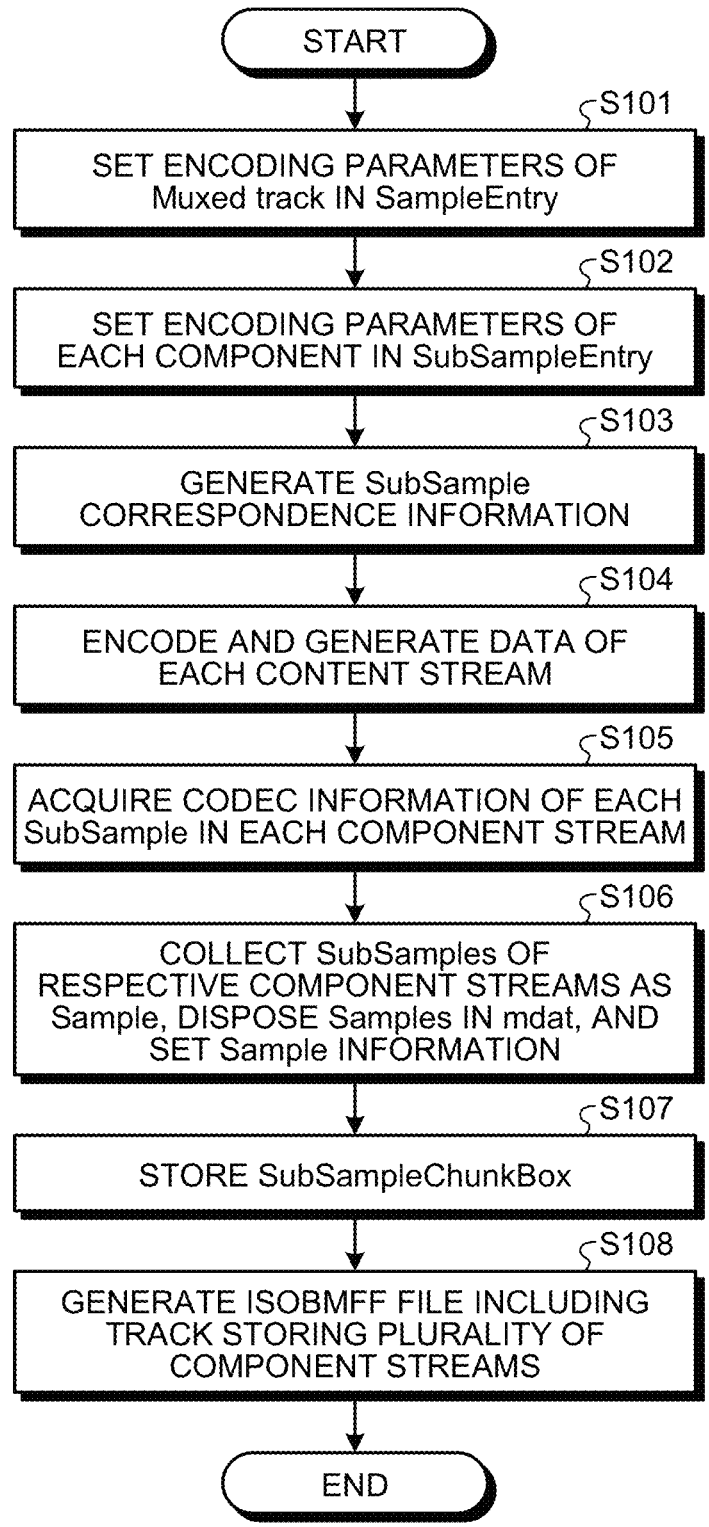
FIG. 9 is a flowchart of a file generation process performed by the file generation device according to the first embodiment.

Next, a flow of a file generation process performed by the file generation device 1 according to the first embodiment will be described in detail with reference to FIG. 9. FIG. 9 is a flowchart of the file generation process performed by the file generation device according to the first embodiment.

The data acquisition unit 101 acquires the original data of a video content from the Web server 3. The preprocessing unit 102 then outputs image data and control information to be encoded included in the acquired original data acquired by the data acquisition unit 101 to the encoding unit 103. The preprocessing unit 102 sets encoding parameters of a Muxed track in SampleEntry by using the control information included in the acquired original data (step S101).

Next, the preprocessing unit 102 sets encoding parameters of each component in SubSampleEntry (step S102). That is, the preprocessing unit 102 generates SubSample-related information in which SubSampleEntry of each component is set in the related information together with component_id, muxed_stream_specific_type, and handler_type.

In addition, the preprocessing unit 102 generates SubSample correspondence information from the codec information of SubSample and the arrangement of Samples and SubSamples (step S103). The preprocessing unit 102 then outputs the image data and the metadata to the encoding unit 103. Furthermore, the preprocessing unit 102 outputs metadata including the SubSample-related information and the SubSample correspondence information to the file generation unit 104.

The encoding unit 103 receives an input of the image data and the metadata from the data acquisition unit 101. The encoding unit 103 then encodes the image data and the metadata to generate encoded data of each component stream (step S104). Thereafter, the encoding unit 103 outputs the encoded data of each component stream to the file generation unit 104.

The file generation unit 104 receives an input of the encoded data of each component stream from the encoding unit 103. In addition, the file generation unit 104 receives an input of the metadata including the SubSample-related information and the SubSample correspondence information from the preprocessing unit 102. The file generation unit 104 then acquires codec information of each SubSample in each component stream (step S105).

Next, the file generation unit 104 creates a Muxed track by collecting SubSamples of the respective components as Sample, disposes Samples in mdat, and sets Sample information (step S106). That is, the file generation unit 104 stores SampleEntry of each Muxed track in SampleEntryBox disposed in SampleTable of moov.

Next, the file generation unit 104 stores SubSampleToCunkBox in moof (step S107).

The file generation unit 104 then generates an ISOBMFF file that has a Muxed track including the component stream of each component (step S108). Thereafter, a transmission unit 108 uploads the segment file of the video content generated by the file generation unit 104 to the Web server 3.

(Procedure of Reproduction Process According to First Embodiment)

Next, a flow of a reproduction process performed by the client device 2 according to the first embodiment will be described with reference to FIG. 10. FIG. 10 is a flowchart of the reproduction process performed by the client device according to the first embodiment.

The file acquisition unit 201 acquires a segment file of a video content to be reproduced from the Web server 3. The file processing unit 202 parses the segment file of the video content acquired by the file acquisition unit 201. The file processing unit 202 then acquires Sample and SampleEntry from an ISOBMFF file. Thereafter, the file processing unit 202 outputs the acquired Sample and SampleEntry to the decoding processing unit 203. In addition, the file processing unit 202 outputs metadata to the display information generation unit 205. The decoding processing unit 203 acquires Samples and SampleEntry and sets decoding (step S201).

Next, the decoding processing unit 203 specifies a corresponding SubSampleEntry from SubSampleToCunkBox for each SubSample multiplexed in the acquired Sample, sets decoding of each component, and decodes data of each component stream (step S202).

The display information generation unit 205 acquires the decoded data of each component stream from the decoding processing unit 203. In addition, the display information generation unit 205 acquires an operation command from the display control unit 204. The display information generation unit 205 then performs a display process of, in response to the operation command, performing rendering using the data of each component stream to generate a display image, and of causing a display unit 207 to display the display image (step S203).

Thereafter, the file processing unit 202, the decoding processing unit 203, the display control unit 204, and the display information generation unit 205 determine whether or not to continue the reproduction process (step S204). For example, in a case where a stop command or the like is input from a user, the file processing unit 202, the decoding processing unit 203, the display control unit 204, and the display information generation unit 205 determine not to continue the reproduction process. In a case where the reproduction process is continued (step S204: Yes), the video reproduction process returns to step S201. On the other hand, in a case where decoding of all the image data of the video content is completed (step S204: No), the file processing unit 202, the decoding processing unit 203, the display control unit 204, and the display information generation unit 205 end the video reproduction process.

As described above, the file generation device according to the present embodiment defines the media attribute of each component stream included in the Muxed track, and associates the attribute with SubSampleEntry including the attribute information of the codec of each component stream. Further, the file generation device associates the attribute information of the codec of each component stream that can be dynamically changed with SubSampleEntry of each component stream by using SubSampleToChunkBox. As a result, since a plurality of component streams are included in one track, time information and the like of each component stream can be shared, and the amount of information can be reduced. That is, it is possible to reduce the amount of information and provide a viewer with a high-quality viewing experience. In addition, it is possible to implement, for each component stream collectively stored in a single track, the mechanism of ISOBMFF that has been implemented with tracks so far, in which the handler information that is media attribute information of a track is defined, SampleEntry representing the codec attribute information is defined, and the codec information of Sample is dynamically associated with SampleEntry.

[1.1 Modification of First Embodiment]

Next, a modification of the first embodiment will be described. In the first embodiment, handler information that is type information of a component stream corresponding to each SubSample is stored in SubSampleEntryBox. However, SampleEntry stores Sample-specific information, and thus SubSampleEntry preferably stores SubSample-specific information.

Consequently, in the present modification, information of the handler of a component stream corresponding to each SubSample included in a Muxed track is stored in a header region of a file different from the SubSampleEntryBox. FIG. 11 is a diagram illustrating an example of syntax of SubSampleToHandlerBox and SubSampleEntryBox according to the modification of the first embodiment.

The preprocessing unit 102 newly defines and generates SubSample handler information that indicates the content of SubSampleHandlerBox represented by syntax 181. In this case, the preprocessing unit 102 sets, in the SubSample handler information, component_id that is identification information of SubSample and handler_type that is information of the handler of a component stream corresponding to each SubSample.

In addition, the preprocessing unit 102 generates SubSample-related information that indicates the content of SubSampleEntryBox represented by syntax 182. In this case, the preprocessing unit 102 sets, in the SubSample-related information, component_id that is identification information of SubSample and Muxed_stream_specific_type that indicates the type of a component stream corresponding to each SubSample. Furthermore, the preprocessing unit 102 also sets SubSampleEntry( ) in the SubSample-related information.

That is, SubSample-specific information is set in the SubSample-related information. Meanwhile, in the SubSample handler information, information of the handler of a component stream corresponding to SubSample is stored. Both pieces of the SubSample handler information and the SubSample-related information are linked with each other by component_id and linked with SubSample correspondence information.

The file generation unit 104 receives an input of metadata including the SubSample-related information, the SubSample handler information, and the SubSample correspondence information from the preprocessing unit 102. The file generation unit 104 then newly defines SubSampleEntryBox that is represented by the syntax 181 and stores SubSample-related information, and stores the SubSampleEntryBox in moov. In addition, the file generation unit 104 newly defines SubSampleHandlerBox that is represented by the syntax 182 and stores SubSample handler information, and stores the SubSampleHandlerBox in moov. Further, the file generation unit 104 stores SubSampleToChunkBox including SubSample correspondence information in moof. The file generation unit 104 then generates an ISOBMFF file storing each component stream.

By configuring SubSampleHandlerBox and SubSampleEntryBox in this manner, SubSampleEntry can also be configured to follow the relationship between Sample and SampleEntry.

2. Second Embodiment

The file generation device 1 according to the present embodiment stores a parameter set of SubSample in SubSample and transmits the parameter set together with a component stream. Hereinafter, the file generation device 1 according to the present embodiment will be described. The file generation device 1 according to the present embodiment is also illustrated in the block diagram of FIG. 2. In addition, the client device 2 according to the present embodiment is also illustrated in the block diagram of FIG. 6. In the following description, description of operations of the same units as those of the first embodiment will be omitted.

Figure 12:
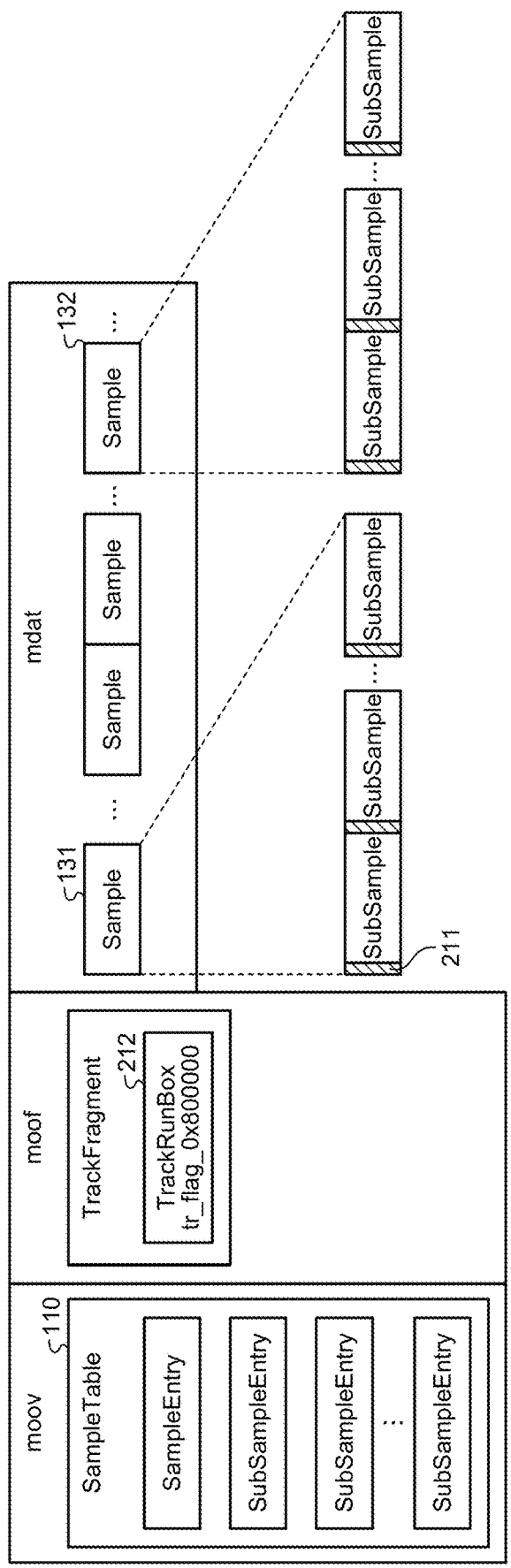
FIG. 12 is a diagram for describing a storage state of a parameter set.

FIG. 12 is a diagram for describing a storage state of a parameter set. The preprocessing unit 102 determines storage of a parameter set 211 in SubSample as illustrated in FIG. 12. The parameter set 211 includes information used for initializing SubSample of each component stream in a Muxed track and information for associating SubSample with SubSampleEntry. For example, the preprocessing unit 102 stores the parameter set 211 in SubSample by using Supplemental Enhancement Information (SEI) of a codec.

As described above, the preprocessing unit 102 according to the present embodiment transmits the information equivalent to SampleEntry-related information of each component stream in an inbound stream by using the parameter sets of the codec and SEI. On the other hand, in moof as in the first embodiment, it is also possible to store information related to SampleEntry for each SubSample by disposing SubSampleToChunkBox under TrackFragmentBox. However, in the case of using TrackFragmentBox, since the link between SubSample and a SubSample entry is identified using SubSampleToChunkBox, the overhead of moof is large.

That is, the preprocessing unit 102 according to the present embodiment can reduce the overhead of moof as compared with the case of using SubSampleToChunkBox. In this case, it is necessary to notify a client that the parameter set 211 is transmitted in the inbound stream. However, when a new BOX is defined, an overhead of moof is generated, and thus, it is preferable to use a reserved bit of an existing BOX. Consequently, the preprocessing unit 102 according to the present embodiment performs the following definition.

The preprocessing unit 102 newly defines an undefined bit of tr_frag of TrackTunBox by allocating the bit to a notification for transmitting the parameter set 211 of SubSample for each component stream in the inbound stream. The information used for this notification corresponds to an example of "storage notification information". In the present embodiment, the preprocessing unit 102 allocates bit 0x800000 of tr_flags to a notification for transmitting the parameter set 211 of SybSample for each component stream in the inbound stream. The preprocessing unit 102 then notifies the file generation unit 104 of the storage of the parameter set 211 in SubSample and the enable of bit 0x800000 of tr_flags. As a result, the preprocessing unit 102 does not need to store SubSampleToChunkBox in moof that is each fragmented header region.

In addition, the preprocessing unit 102 generates SubSampleEntry of each component stream. In this case, since the parameter set 211 is transmitted in the inbound stream, the preprocessing unit 102 sets, in SubSampleEntry, capability information indicating whether or not each SubSample can be used by the application that performs a reproduction process. Examples of the capability information include information indicating the type of a codec, image size information, and frame sheet information.

The file generation unit 104 receives a notification of the storage of the parameter set 211 in SubSampleEntry and SubSample, and the enable of bit 0x800000 of tr_flags from the preprocessing unit 102. As illustrated in FIG. 12, the file generation unit 104 then stores SubSampleEntry of each component stream in moov.

In addition, as illustrated in FIG. 12, the file generation unit 104 stores the parameter set 211 in SubSample. Furthermore, the file generation unit 104 enables bit 0x800000 of tr_flags in TrackRunBox as indicated by BOX 212, and indicates that the parameter set 211 of each SubSample is transmitted together with the data of the component stream in an mdat region.

Figure 13:
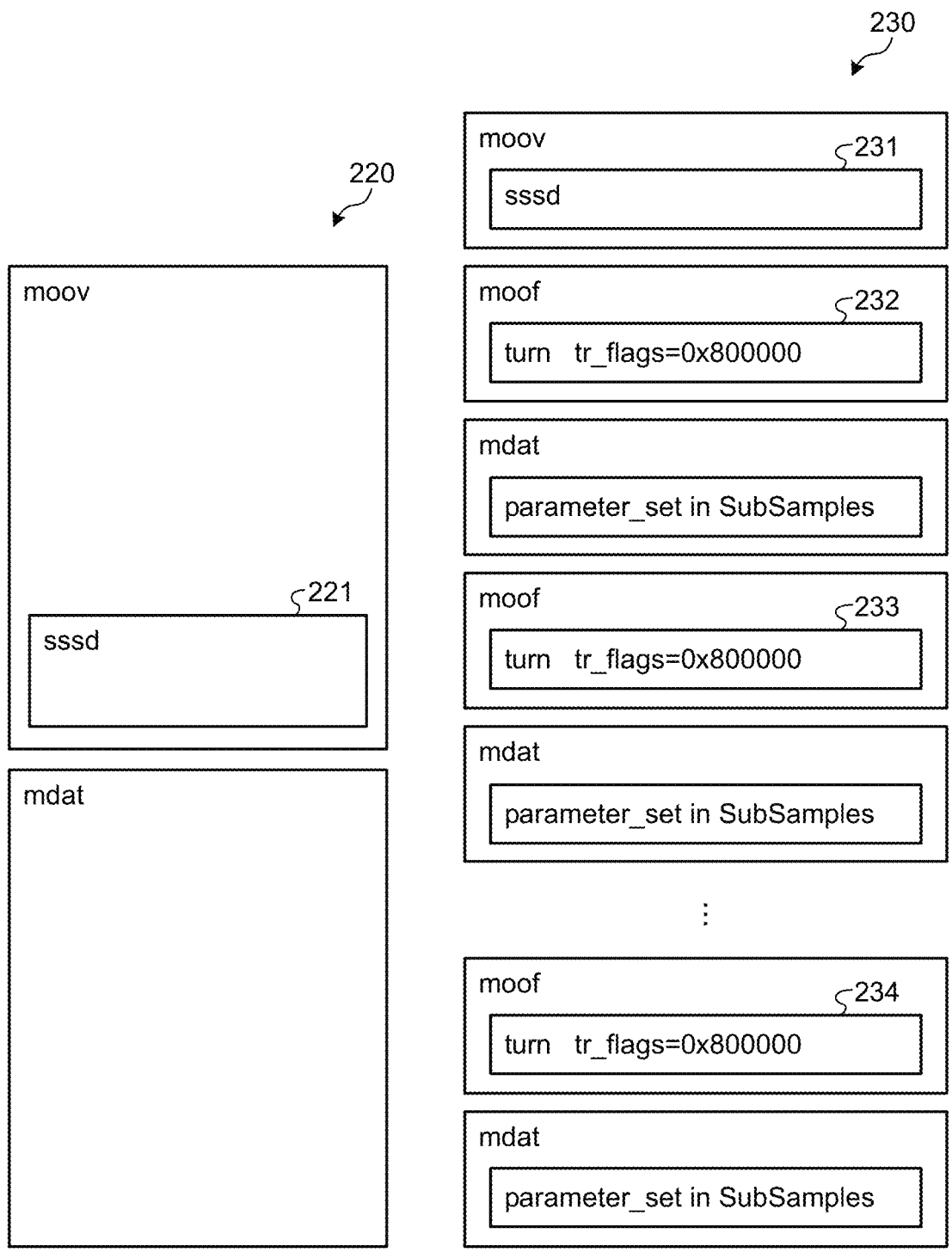
FIG. 13 is a diagram illustrating a storage state of SubSampleEntryBox and tr_flags depending on the presence or absence of fragmentation.

FIG. 13 is a diagram illustrating a storage state of SubSampleEntryBox and tr_flags depending on the presence or absence of fragmentation. In a case where movie fragmentation is not performed, as illustrated in a file 220 of FIG. 13, the file generation unit 105 stores SubSampleEntryBox indicated by BOX 221 in moov.

On the other hand, in a case where the movie fragmentation is performed, as illustrated in a file 230 of FIG. 13, the file generation unit 104 disposes SubSampleEntryBox indicated by BOX 231 in moov. Further, the file generation unit 104 sets the value of bit 0x800000 of tr_flags to enabled in TrackRunBoxes indicated by BOXes 232 to 234 of the respective moof.

Meanwhile, in the client device 2, the file processing unit 202 acquires a parameter set included in each SubSample when parsing a segment file. The file processing unit 202 then outputs the parameter set to the decoding processing unit 203 together with the bit stream for each component stream.

The decoding processing unit 203 receives an input of the parameter set together with the bit stream for each component stream from the file processing unit 202. The decoding processing unit 203 then initializes each bit stream using the acquired parameter set. Thereafter, the decoding processing unit 203 decodes the data of each component stream using encoding parameters stored in SubSampleEntry.

(File Generation Procedure According to Second Embodiment)

Figure 14:
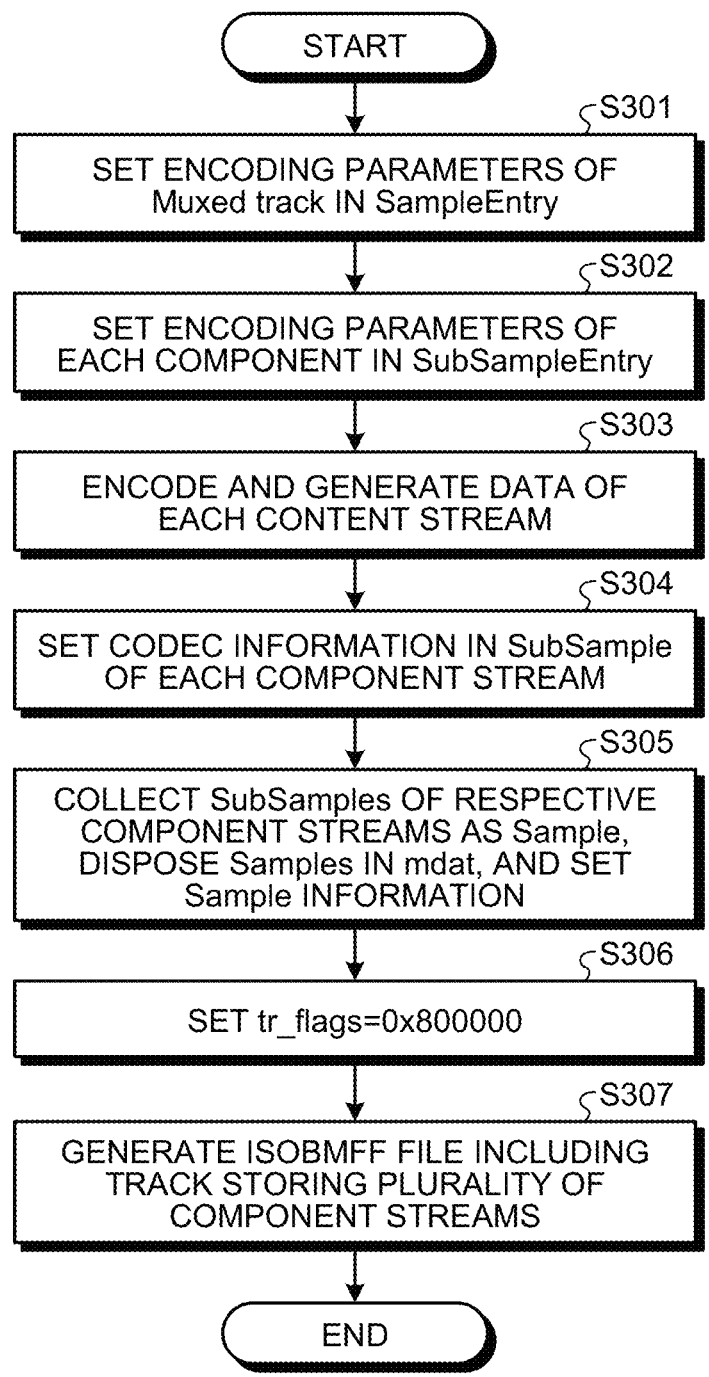
FIG. 14 is a flowchart of a file generation process performed by a file generation device according to a second embodiment.

Next, a flow of a file generation process performed by the file generation device 1 according to the second embodiment will be described in detail with reference to FIG. 14. FIG. 14 is a flowchart of the file generation process performed by the file generation device according to the second embodiment.

The data acquisition unit 101 acquires the original data of a video content from the Web server 3. The preprocessing unit 102 then outputs image data and control information to be encoded included in the acquired original data acquired by the data acquisition unit 101 to the encoding unit 103. The preprocessing unit 102 sets encoding parameters of a Muxed track in SampleEntry by using the control information included in the acquired original data (step S301).

Next, the preprocessing unit 102 sets encoding parameters of each component in SubSampleEntry (step S302).

The encoding unit 103 receives an input of the image data and the metadata from the data acquisition unit 101. The encoding unit 103 then encodes the image data and the metadata to generate encoded data of each component stream (step S303). Thereafter, the encoding unit 103 outputs the encoded data of each component stream to the file generation unit 104.

Next, the file generation unit 104 sets codec information in SubSample of each component stream (step S304). As a result, the parameter set of each SubSample is bound to a bit stream.

Next, the file generation unit 104 creates a Muxed track by collecting SubSamples of the respective components as one Sample, disposes Samples in mdat, and sets Sample information (step S305).

Next, the file generation unit 104 sets the value of bit 0x800000 of tr_flags of moof to enabled (step S306).

The file generation unit 104 then generates an ISOBMFF file that has the Muxed track including the component stream of each component (step S307). Thereafter, the transmission unit 108 uploads the segment file of the video content generated by the file generation unit 104 to the Web server 3.

(Procedure of Reproduction Process according to Second Embodiment)

Figure 15:
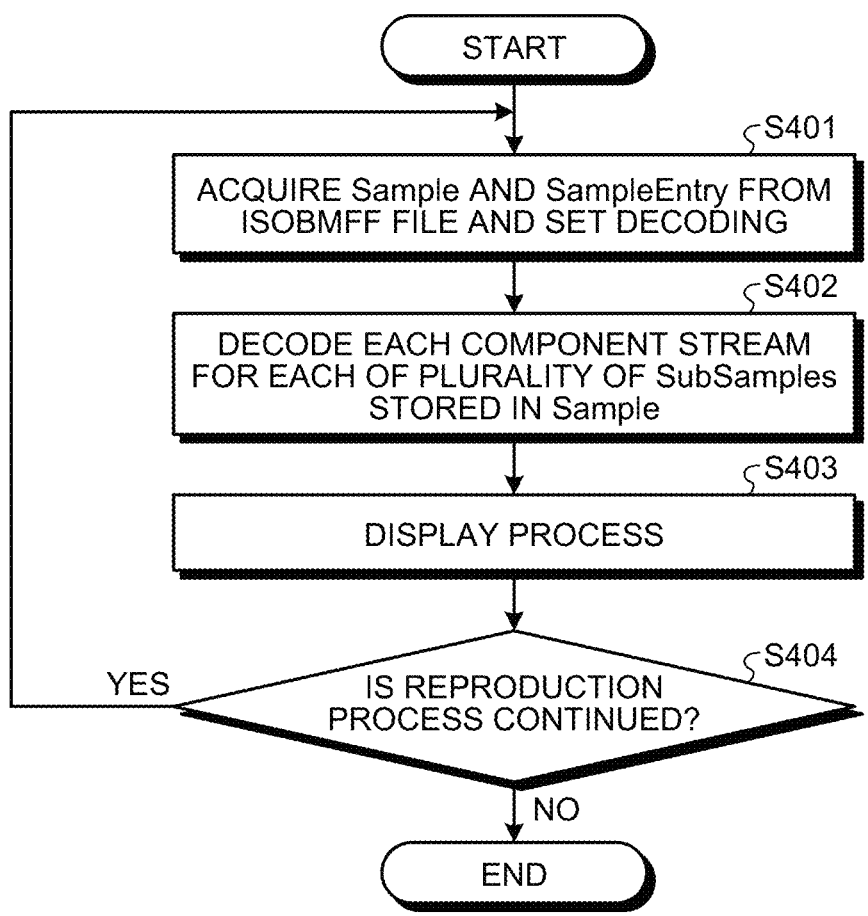
FIG. 15 is a flowchart of a reproduction process performed by a client device according to the second embodiment.

Next, a flow of a reproduction process performed by the client device 2 according to the second embodiment will be described with reference to FIG. 15. FIG. 15 is a flowchart of the reproduction process performed by the client device according to the second embodiment.

The file acquisition unit 201 acquires a segment file of a video content to be reproduced from the Web server 3. The file processing unit 202 parses the segment file of the video content acquired by the file acquisition unit 201. The file processing unit 202 then acquires Sample and SampleEntry from an ISOBMFF file. Thereafter, the file processing unit 202 outputs the acquired Sample and SampleEntry to the decoding processing unit 203. In addition, the file processing unit 202 outputs metadata to the display information generation unit 205. The decoding processing unit 203 acquires Sample and SampleEntry and sets decoding (step S401).

Next, the decoding processing unit 203 acquires parameter sets added to the bit stream for each of the plurality of SubSamples stored in the acquired Sample. The decoding processing unit 203 then decodes each component stream using the parameter sets and the information of the corresponding SubSampleEntry (step S402).

The display information generation unit 205 acquires the decoded data of each component stream from the decoding processing unit 203. In addition, the display information generation unit 205 acquires an operation command from the display control unit 204. The display information generation unit 205 then performs a display process of, in response to the operation command, performing rendering using the data of each component stream to generate a display image, and of causing the display unit 207 to display the display image (step S403).

Thereafter, the file processing unit 202, the decoding processing unit 203, the display control unit 204, and the display information generation unit 205 determine whether or not to continue the reproduction process (step S404). For example, in a case where a stop command or the like is input from a user, the file processing unit 202, the decoding processing unit 203, the display control unit 204, and the display information generation unit 205 determine not to continue the reproduction process. In a case where the reproduction process is continued (step S404: Yes), the video reproduction process returns to step S401. On the other hand, in a case where decoding of all the image data of the video content is completed (step S404: No), the file processing unit 202, the decoding processing unit 203, the display control unit 204, and the display information generation unit 205 end the video reproduction process.

As described above, the file generation device according to the present embodiment transmits the parameter set of each SubSample by being bound to a bit stream. That is, the file generation device according to the present embodiment transmits, in the stream, codec attribute information of each component stream that dynamically changes in SubSample of each component stream. As a result, it is possible to omit the linking of each SubSample and SubSampleEntry by setting SubSampleToChunkBox in the header region at the time of fragmentation, and it is possible to reduce the overhead due to the management information at the time of fragmentation.

[2.1 Modification of Second Embodiment]

In the second embodiment, tr_flags of TrackRunBox is used to indicate an inbound stream, but the storage location of tr_flags is not limited thereto. For example, the file generation unit 104 may define a flag for indicating the inbound stream as information of the entire fragment by using tr_flags of TrackFragmentHeaderBox in the same hierarchy as TrackRunBox.

In addition, in a case where SubSampleToChunkBox is not disposed under TrackFragmentBox, the file generation unit 104 may perform definition with semantics that SubSampleEntry for each SubSample is transmitted in the inbound stream.

As described above, in addition to using tr_flags of TrackRunBox, parameters of each SubSample can be transmitted in the inbound stream, and also in such a case, the overhead due to the management information at the time of fragmentation can be reduced. Information used for notification made other than the case of using tr_flags also corresponds to an example of "storage notification information".

The structure described in each of the above embodiments and modifications can be applied to a stream including a plurality of component streams in addition to V-PCC.

3. Third Embodiment

Figure 16:
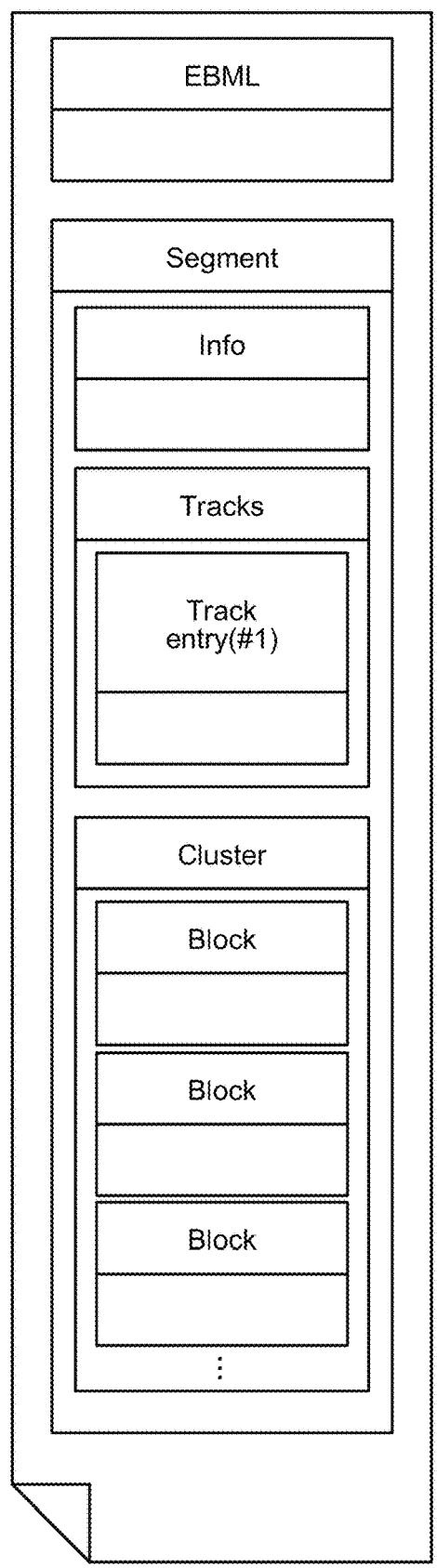
FIG. 16 is a diagram illustrating a format of Matroska Media Container.

The above embodiments and modifications thereof have described the case of storing in ISOBMFF. However, even in a case where transmission is performed by using Matroska Media Container (http://www.matroska.org/) illustrated in FIG. 16, it is possible to define the media attribute of each of a plurality of component streams and associate the codec attribute information of each component stream with the data of each component stream. FIG. 16 is a diagram illustrating a format of Matroska Media Container. In this case, the file generation unit 105 stores the information stored in SubSampleEntryBox and the information stored in SubSampleToChunkBox in each of the embodiments and modifications in an element newly defined in Track Entry element.

[Hardware Configuration]

Figure 17:
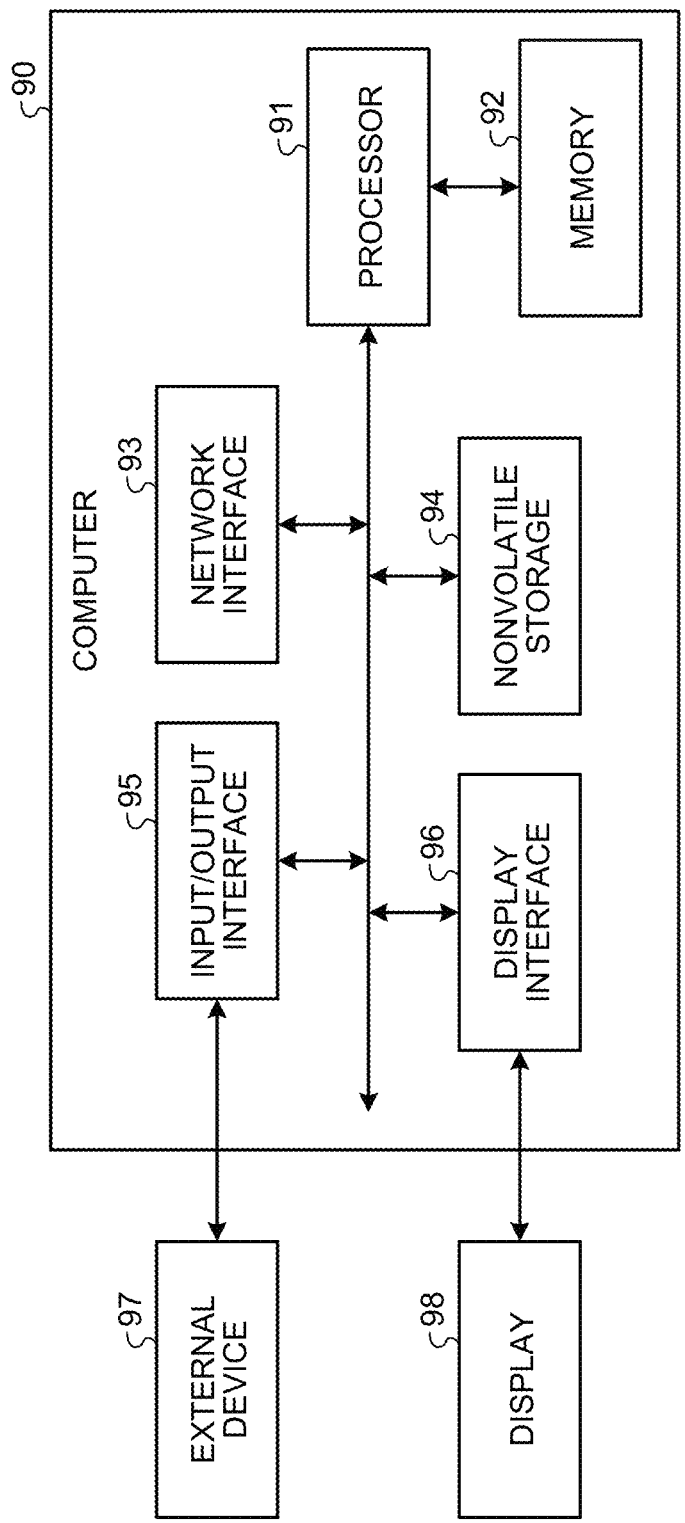
FIG. 17 is a hardware configuration diagram of a computer.

FIG. 17 is a hardware configuration diagram of a computer. The file generation device 1 and the client device 2 can be implemented by a computer 90 illustrated in FIG. 17. In the computer 90, a processor 91, a memory 92, a network interface 93, a nonvolatile storage 94, an input/output interface 95, and a display interface 86 are connected to one another via a bus.

For example, external devices such as an input device, an output device, a storage device, and a drive are connected to the input/output interface 95. The input device is, for example, a keyboard, a mouse, a microphone, a touch panel, an input terminal, or the like. The output device is, for example, a speaker, an output terminal, or the like. The storage device is, for example, a hard disk, a random access memory (RAM) disk, or the like. The drive drives a removable medium such as a magnetic disk, an optical disk, a magneto-optical disk, or a semiconductor memory. In addition, a display 98, which is a display device, is connected to a display interface 96.

The network interface 93 is connected to an external network. The file generation device 1 and the client device 2 are connected to each other via the network interface 93. In addition, the file generation device 1 and the client device 2 are connected to the Web server 3 via the network interface 93. The nonvolatile storage 94 is a built-in auxiliary storage device such as a hard disk or a solid state drive (SSD).

In the computer 90 configured as described above, for example, the processor 91 loads a program stored in the nonvolatile storage 94 into the memory 92 via the bus and executes the program, so that a series of processing described above is performed. The memory 92 also appropriately stores data and the like necessary for the processor 91 to perform various types of processing.

The program executed by the processor 91 can be applied by being recorded in a removable medium as a package medium or the like, for example. In this case, the program can be installed in the nonvolatile storage 94 via the input/output interface 95 by attaching the removable medium to a drive that is the external device 97.

In addition, this program can also be provided via a wired or wireless transmission medium such as a local area network, the Internet, or digital satellite broadcasting. In this case, the program can be received by the network interface 93 and installed in the nonvolatile storage 94.

In addition, this program can be installed in the nonvolatile storage 94 in advance.

The embodiments of the present disclosure have been described above, but the technical scope of the present disclosure is not limited to the embodiments described above, and various changes can be made without departing from the gist of the present disclosure. In addition, components of different embodiments and modifications may be combined as appropriate.

It should be noted that the effects described in the present specification are merely examples and are not limited, and other effects may be obtained.

Note that the present technology can also have the following configurations.

(1)

An information processing device comprising:

a preprocessing unit that individually generates SubSample information used for decoding each of SubSamples, which are a plurality of component streams, in a content stream including the SubSamples; and a file generation unit that generates a file including the SubSample information generated by the preprocessing unit.

(2)

The information processing device according to (1), wherein the preprocessing unit causes SubSample-related information that corresponds to each of a plurality of the SubSamples and includes identification information of the SubSample, type information of a plurality of the component streams, media attribute information of the SubSample, and codec attribute information to be included in the SubSample information.

(3)

The information processing device according to (2), wherein the file generation unit inserts the SubSample-related information into a single header region of a file format having the header region and a single data region to generate a file in which a single content stream generated from a plurality of the component streams is inserted into the data region.

(4)

The information processing device according to (2), wherein the file generation unit inserts the SubSample-related information into a first header region including initialization information of a file format having the first header region, a plurality of data regions, and a plurality of second header regions corresponding to the data regions to generate a file in which a single content stream generated from a plurality of the component streams is divided and inserted into each of the data regions.

(5)

The information processing device according to (2), wherein the file generation unit stores the SubSample-related information in SubSampleEntryBox.

(6)

The information processing device according to (2), wherein the preprocessing unit causes SubSample correspondence information indicating correspondence between a plurality of the SubSamples and the SubSample-related information to be further included in the SubSample information.

(7)

The information processing device according to (6), wherein the file generation unit stores the SubSample correspondence information in SubSampleToChunkBox of the file.

(8)

The information processing device according to (2), wherein the preprocessing unit generates first related information including identification information of the SubSample and type information of the component stream among the SubSample-related information, and second related information including identification information of the SubSample and media attribute information of the SubSample.

(9)

The information processing device according to (8), wherein the file generation unit stores the first related information in SubSamplehandlerBox, and stores the second related information in SubSampleEntryBox.

(10)

The information processing device according to (1), wherein the preprocessing unit causes a parameter set used for decoding to be included in the SubSample information.

(11) The information processing device according to (10), wherein the file generation unit causes the SubSample information to be included in the component stream.

(12)

The information processing device according to (11), wherein the file generation unit generates storage notification information indicating that the SubSample information is included in the component stream, and stores the storage notification information in TrackRunBox.

(13)

An information processing method that causes a computer to perform processing of:

individually generating SubSample information used for decoding each of SubSamples, which are a plurality of component streams, in a content stream including the SubSamples; and generating a file including the SubSample information generated.

(14)

A reproduction processing device comprising:

a file processing unit that acquires SubSample information used for decoding each of SubSamples, which are a plurality of component streams, from a header region of a file generated according to a file format having the header region and a data region in which a content stream including the SubSamples is stored; and a decoding processing unit that decodes the content stream on a basis of the SubSample information acquired by the file processing unit.

(15)

A reproduction processing method that causes a computer to perform processing of:

acquiring SubSample information used for decoding each of SubSamples, which are a plurality of component streams, from a header region of a file generated according to a file format having the header region and a data region in which a content stream including the SubSamples is stored; and decoding the content stream on a basis of the SubSample information acquired.

REFERENCE SIGNS LIST

1 FILE GENERATION DEVICE
2 CLIENT DEVICE
3 Web SERVER
10 FILE GENERATION PROCESSING UNIT
11 CONTROL UNIT
12 TRANSMISSION UNIT
20 REPRODUCTION PROCESSING UNIT
21 CONTROL UNIT
100 DISTRIBUTION SYSTEM
101 DATA ACQUISITION UNIT
102 PREPROCESSING UNIT
103 ENCODING UNIT
104 FILE GENERATION UNIT
201 FILE ACQUISITION UNIT
202 FILE PROCESSING UNIT
203 DECODING PROCESSING UNIT
204 DISPLAY CONTROL UNIT
205 DISPLAY INFORMATION GENERATION UNIT
206 DISPLAY UNIT

The invention claimed is:

1. An information processing device comprising:
circuitry configured to
individually generate SubSample information used for decoding each of SubSamples, which are a plurality of component streams, in a content stream including the SubSamples; and
generate a file including the SubSample information that is generated, wherein
the circuitry is further configured to cause SubSample-related information that corresponds to each of a plurality of the SubSamples and includes identification information of the SubSample, type information of a plurality of the component streams, media attribute information of the SubSample, and codec attribute information to be included in the SubSample information.

2. The information processing device according to claim 1, wherein the circuitry is further configured to insert the SubSample-related information into a single header region of a file format having the header region and a single data region and generate a file in which a single content stream generated from a plurality of the component streams is inserted into the data region.

3. The information processing device according to claim 1, wherein the circuitry is further configured to insert the SubSample-related information into a first header region including initialization information of a file format having the first header region, a plurality of data regions, and a plurality of second header regions corresponding to the data regions and generate a file in which a single content stream generated from a plurality of the component streams is divided and inserted into each of the data regions.

4. The information processing device according to claim 1, wherein the circuitry is further configured to store the SubSample-related information in SubSampleEntryBox.

5. The information processing device according to claim 1, wherein the circuitry is further configured to cause SubSample correspondence information indicating correspondence between a plurality of the SubSamples and the SubSample-related information to be further included in the SubSample information.

6. The information processing device according to claim 5, wherein the circuitry is further configured to store the SubSample correspondence information in SubSampleToChunkBox of the file.

7. The information processing device according to claim 1, wherein the circuitry is further configured to generate first related information including identification information of the SubSample and type information of the component stream among the SubSample-related information, and second related information including identification information of the SubSample and media attribute information of the SubSample.

8. The information processing device according to claim 7, wherein the circuitry is further configured to store the first related information in SubSamplehandlerBox, and store the second related information in SubSampleEntryBox.

9. The information processing device according to claim 1, wherein the circuitry is further configured to cause a parameter set used for decoding to be included in the SubSample information.

10. The information processing device according to claim 9, wherein the circuitry is further configured to cause the SubSample information to be included in the component stream.

11. The information processing device according to claim 10, wherein the circuitry is further configured to generate storage notification information indicating that the SubSample information is included in the component stream, and store the storage notification information in TrackRun-Box.

12. An information processing method that causes a computer to perform processing of:
   individually generating SubSample information used for decoding each of SubSamples, which are a plurality of component streams, in a content stream including the SubSamples;
   generating a file including the SubSample information generated; and
   causing SubSample-related information that corresponds to each of a plurality of the SubSamples and includes identification information of the SubSample, type information of a plurality of the component streams, media attribute information of the SubSample, and codec attribute information to be included in the SubSample information.

13. A reproduction processing device comprising:
   circuitry configured to
      acquire SubSample information used for decoding each of SubSamples, which are a plurality of component streams, from a header region of a file generated according to a file format having the header region and a data region in which a content stream including the SubSamples is stored; and
      decode the content stream on a basis of the SubSample information that is acquired, wherein
      SubSample-related information that corresponds to each of a plurality of the SubSamples and includes identification information of the SubSample, type information of a plurality of the component streams, media attribute information of the SubSample, and codec attribute information is included in the SubSample information.

14. A reproduction processing method that causes a computer to perform processing of:
   acquiring SubSample information used for decoding each of SubSamples, which are a plurality of component streams, from a header region of a file generated according to a file format having the header region and a data region in which a content stream including the SubSamples is stored; and
   decoding the content stream on a basis of the SubSample information that is acquired, wherein
   SubSample-related information that corresponds to each of a plurality of the SubSamples and includes identification information of the SubSample, type information of the component streams, media attribute information of the SubSample, and codec attribute information is included in the SubSample information.

* * * * *